(12) United States Patent
Feenstra et al.

(10) Patent No.: US 7,307,672 B2
(45) Date of Patent: Dec. 11, 2007

(54) DISPLAY APPARATUS

(75) Inventors: Bokke Johannes Feenstra, Eindhoven (NL); Gerjan Franciscus Arthur Van De Walle, Eindhoven (NL); Menno Willem Jose Prins, Eindhoven (NL)

(73) Assignee: Koninklijke Philips Electronics N.V. (NL)

( * ) Notice: Subject to any disclaimer, the term of this patent is extended or adjusted under 35 U.S.C. 154(b) by 644 days.

(21) Appl. No.: 10/505,490

(22) PCT Filed: Feb. 6, 2003

(86) PCT No.: PCT/IB03/00419

§ 371 (c)(1),
(2), (4) Date: Aug. 19, 2004

(87) PCT Pub. No.: WO03/071335

PCT Pub. Date: Aug. 28, 2003

(65) Prior Publication Data

US 2005/0253779 A1 Nov. 17, 2005

(30) Foreign Application Priority Data

Feb. 20, 2002 (EP) .................................. 02075687

(51) Int. Cl.
*G02F 1/1335* (2006.01)
*G02F 1/153* (2006.01)
*G02B 26/02* (2006.01)

(52) U.S. Cl. ........................ 349/15; 359/228; 359/272; 359/832

(58) Field of Classification Search .................. 349/15, 349/34, 95; 359/228, 272, 462–463, 253, 359/832, 245; 345/107, 6, 48
See application file for complete search history.

(56) References Cited

U.S. PATENT DOCUMENTS 6,449,081 B1 * 9/2002 Onuki et al. ................. 359/245
6,961,167 B2 * 11/2005 Prins et al. .................. 359/253
7,187,344 B2 * 3/2007 Feenstra et al. ............... 345/6

* cited by examiner

*Primary Examiner*—Toan Ton

(57) ABSTRACT

In a 2D/3D display, a switchable lenticular array having foci which can be switched in a continuous way between first focal strength and a second focal strength is provided. The switchable lenticular array comprises fluid cylindrical lens portions, while the foci can be controlled by electrowetting.

7 Claims, 5 Drawing Sheets

DISPLAY APPARATUS

Figures 1A, 1B:
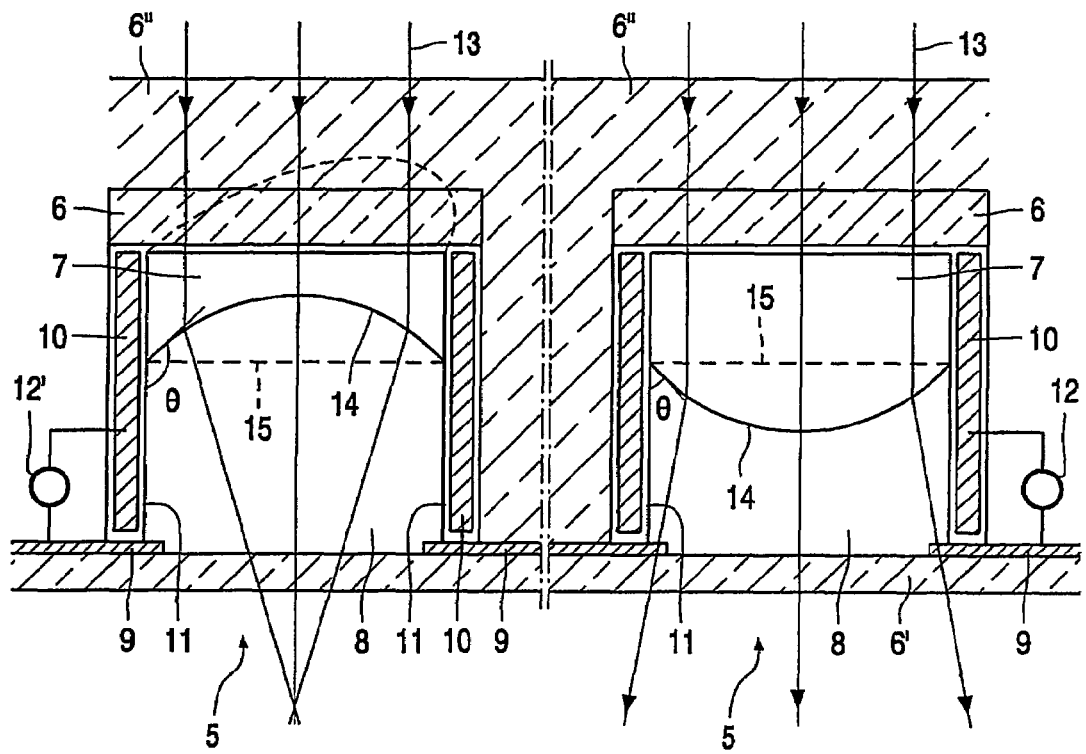

The invention relates to a display apparatus comprising a display device for displaying images comprising pixels, and further comprising means for switching between different types of images of the pixels. Examples of such display apparatuses are, for example, displays which can display both stereo images and plane images. The images to be displayed may originate from various types of display devices such as, for example, light-modulating display devices, for example, LCD panels or micromechanical panels, but also from light-generating display devices, for example, (poly)LED panels, plasma panels or even CRTs.

An example of such a display apparatus which is suitable for both three-dimensional and two-dimensional display is shown in U.S. Pat. No. 6,069,650. This document shows an LCD panel with an array of lenticular elements which are arranged with respect to the pixels in such a way that, in the case of three-dimensional display, sub-pictures are generated for the left and the right eye. The lenticular elements are situated in a space filled with an electro-optical material, for example, a liquid crystal material whose refractive index is switchable between a first and a second value.

By choosing one of the two values to be substantially equal to that of the material of the lenticular elements, the lens action is eliminated in one of the two states so that a two-dimensional image is shown. In the other state, the liquid crystal material has a refractive index which differs from that of the material of the lenticular sheet. By suitably driving the pixels, the information of both eyes is now different (three-dimensional image).

For a suitable liquid crystal material (with a small temperature dependence), the difference of refractive index between the two states is such (of the order of 0.2) that a large curvature is necessary for the elements which are lenticular in this case, so that the layer of liquid crystal material has thickness differences and hence an uneven switching behavior.

Moreover, the liquid crystal material is anisotropic. This means that, for the light passed through the liquid, the difference of refractive index between the ordinary and extraordinary refractive index is not the same in all directions. Consequently, the behavior of the display device, if optimized for one viewing angle, will be poor for other viewing angles (angle dependence).

It is, inter alia, an object of the present invention to obviate said drawbacks as much as possible. According to the invention, the means for switching between the different types of images comprise at least one reservoir containing at least two substantially immiscible fluids having a different refractive index and a different electrical conductivity, and the means for switching between the different types of images are also provided with drive means for varying the shape of an interface between the fluids.

Since the elements with a lens action comprise an isotropic medium, said angle dependence is negligible. Moreover, the difference of refractive index between suitable fluids and air is usually larger than said 0.2 (in a typical example about 0.48) so that it is sufficient to use a smaller thickness of the lenticular sheet. In practice, two fluids will generally be used, preferably with substantially the same density, so that the assembly will be independent of the force of gravity.

The light-transmissive part does not require any (ITO) electrodes or coating so that the transmission is enhanced.

The lenticular elements may constitute both positive and negative lenses. For switching between a two-dimensional and a three-dimensional display, the display apparatus comprises two immiscible fluids having a different refractive index, one of which is electrically conducting and one is substantially insulating, while the shape of the interface is switchable between a curved and a flat surface.

In a first embodiment, the reservoirs have a substantially circular cross-section, viewed in the direction of an image plane. However, the reservoirs preferably have a substantially rectangular or hexagonal cross-section, which yields a larger effective surface area.

These and other aspects of the invention are apparent from and will be elucidated with reference to the embodiments described hereinafter.

Figure 2:
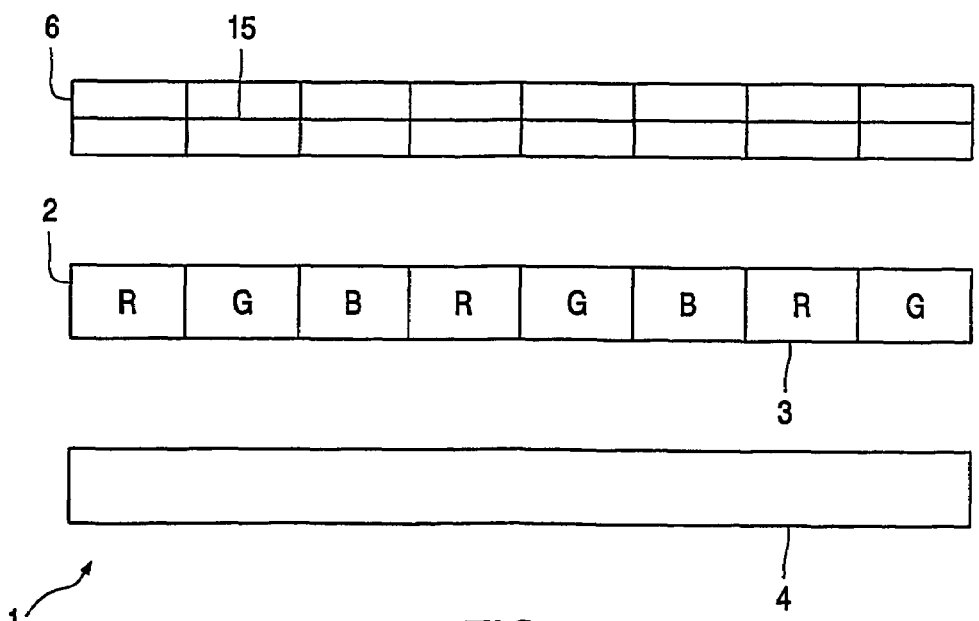
Figure 3:
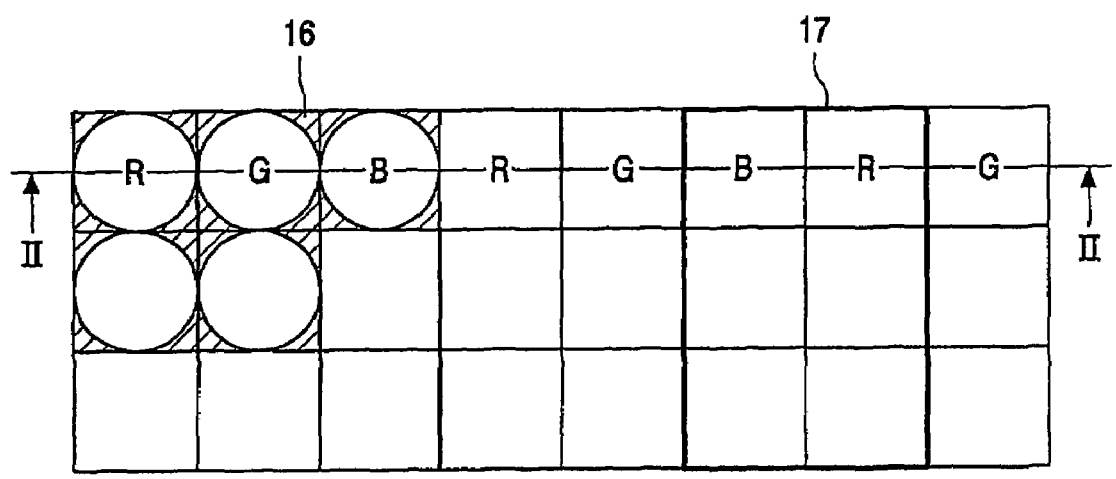
Figure 4:
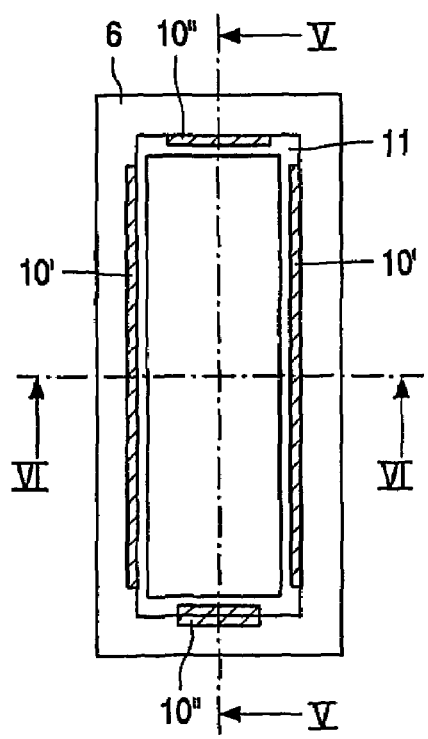
Figure 5:
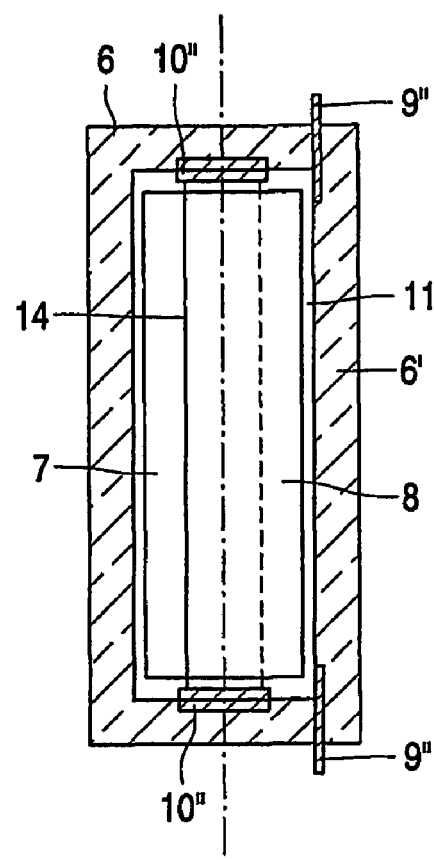
Figure 6:
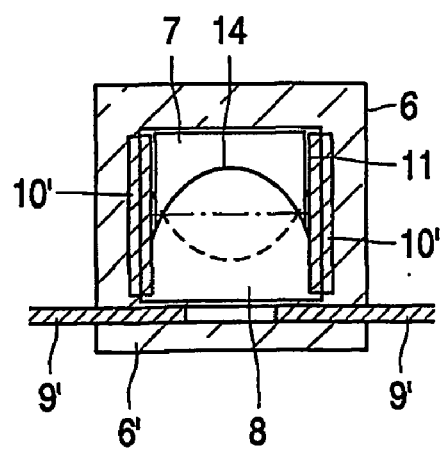
Figure 7:
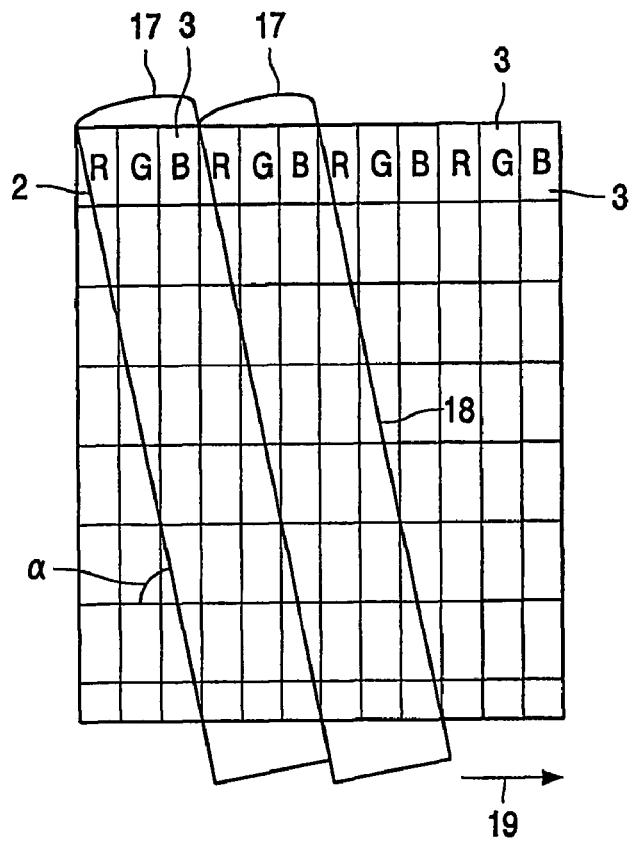
Figure 8:
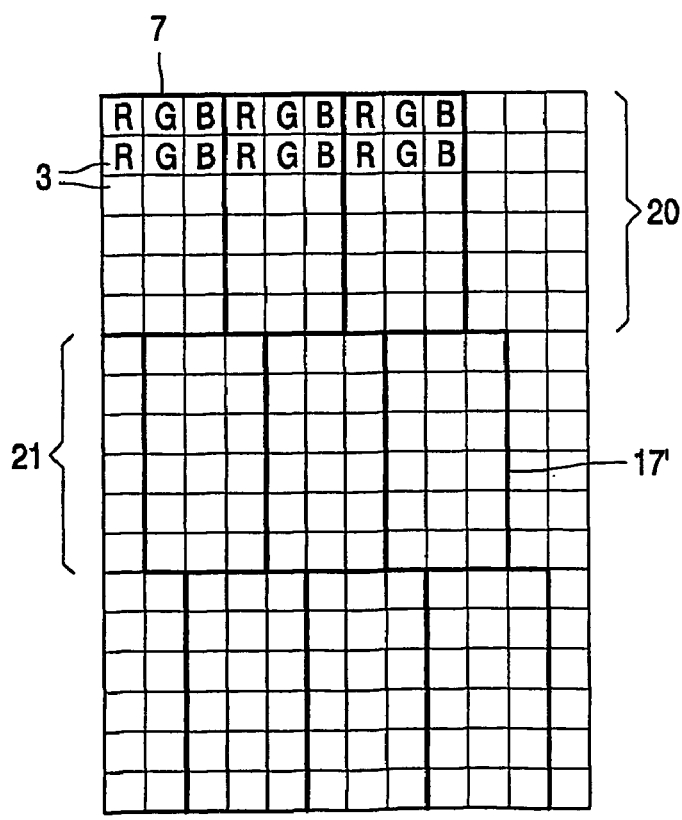
Figures 9A, 9B:
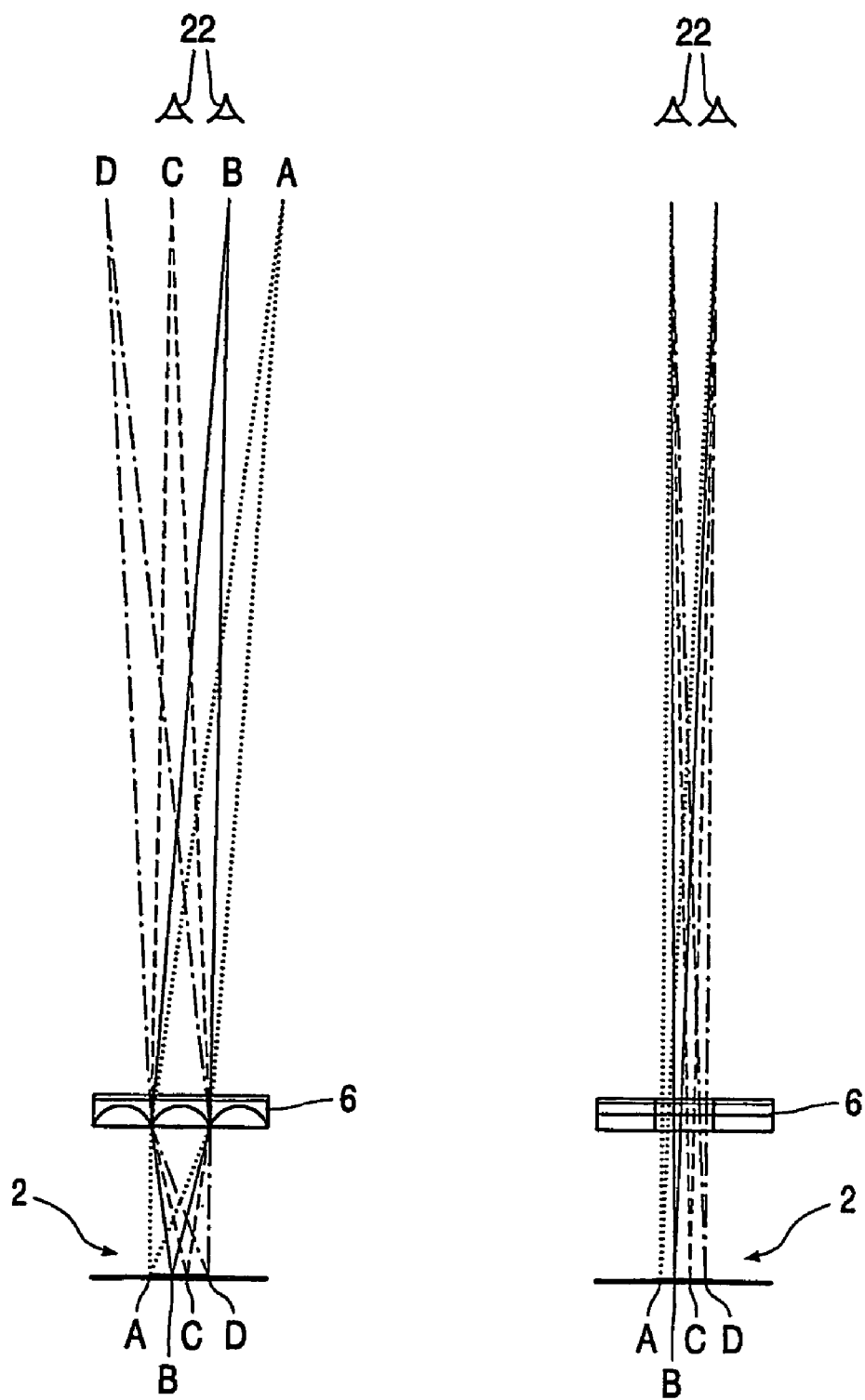

In the drawings:

FIGS. 1a-1b are diagrammatic cross-sections; of a lenticular element according to the invention, FIG. 2 is a cross-section of a display device according to the invention, taken on the line II-II in FIG. 3, FIG. 3 is a plan view of the display device of FIG. 2, FIG. 4 is a plan view of another lenticular element according to the invention, FIGS. 5 and 6 are cross-sections taken on the lines V-V and VI-VI in FIG. 4, while FIGS. 7 and 8 are plan views of other display devices according to the invention, and FIGS. 9a-9b show a typical application.

The Figures are diagrammatic and not drawn to scale; corresponding parts are generally denoted by the same reference numerals.

FIG. 1 shows the principle of a lens with variable focal length as used in the present invention. The lens of FIG. 1 comprises a reservoir 5 having transparent walls 6. In this embodiment, the reservoir 5 has a substantially circular cross-section in a plane transverse to the plane of the drawing. In this embodiment, a plurality of reservoirs is provided on one substrate 6', diagrammatically denoted by means of broken lines 6".

The reservoir 5 of, for example, glass but preferably of a synthetic resin material is arranged in such a way that it is filled, on the one hand, with a first insulating fluid 8, for example, an alcane, such as hexadecane or a silicon oil and, on the other hand, with a polar liquid 7 such as water or a salt solution (for example, KCl dissolved in a mixture of water and ethylalcohol).

First electrodes 9, in this embodiment provided on the substrate 6', project into the polar liquid 7 while second electrodes 10 are situated in the walls of the reservoirs. The electrodes 10 are insulated from the fluid 7 by means of an insulating layer 11. By means of voltage sources 12 shown diagrammatically between the electrodes 9, 10, the curvature of the meniscus between the two fluids 7, 8 can be influenced (electrowetting). Dependent on the used voltage, the contact angle θ will assume a certain value. In the left-hand part of FIG. 1 (situation (a)) the contact angle θ is larger than 90 degrees in this example and the meniscus 14 between the fluids 7, 8 will assume a curvature upwards so that the assembly of the reservoir 6 and fluids 7, 8 functions as a positive lens for incident light (arrows 13). In the right-hand part of FIG. 1 (situation (b)) the contact angle θ is smaller than 90 degrees in this example and the meniscus 14 between the fluids 7, 8 will assume a curvature downwards so that the assembly of the reservoir 6 and fluids 7, 8 functions as a negative lens for incident light (arrows 13).

The insulating layer 11 preferably has such wetting properties that the contact angle (θ) is 90 degrees at a given adjusting voltage. The meniscus 15 between the fluids 7, 8 is now flat. In that case, there is no lens action so that a two-dimensional image is shown. Dependent on the supplied voltages, a lens action can be introduced with a focus which may vary between a given negative and a given positive value.

FIG. 2 is a diagrammatic cross-section and FIG. 3 is a plan view of a part of a display device 1 with a liquid crystal panel 2 comprising a plurality of pixels 3. The display device is provided in the conventional manner with a (flat) light source or backlight 4. For the sake of simplicity, only the pixels 3 and the backlight 4 are shown. Substrates and other possible elements such as polarizers, retardation foils, etc. are not shown in FIG. 2.

In the embodiment of FIG. 1, the reservoirs have a substantially circular cross-section as viewed in the direction of an image plane. Moreover, each reservoir is associated with only one pixel. This will be at the expense of the effective aperture at the area of the part denoted by the shaded area 16 in FIG. 3. The reservoirs are therefore preferably associated with a plurality of pixels and have a substantially rectangular (or hexagonal) cross-section which is diagrammatically denoted by the rectangle 17 in FIG. 3. This yields a larger effective surface. Such a reservoir is diagrammatically shown in FIGS. 4 to 6 in which the reference numerals denote the same components as those in FIG. 1. When the insulating layer 11 has such wetting properties that the contact angle (θ) is 90 degrees at a voltage of 0 V, the electrodes 10" (and the associated voltage source, not shown) can be dispensed with. Alternatively, adjustable voltages at the electrodes 10 (10', 10") may be used for each reservoir so as to obtain a more uniform lens behavior for the entire display device by adjusting the lens action per pixel or group of pixels. This lens behavior may be dependent on the material used and on the location of the reservoir on the surface of the display device. The variable adjustment may also be used for other purposes, for example, for adapting the curvature, dependent on the viewer's distance.

FIG. 7 shows an embodiment in which, viewed in a plan view, the sides 18 of the reservoirs extend at an (acute) angle α with respect to the direction 19 of columns of pixels. The loss of resolution is spread across the row and column direction so that a less striped image is shown. However, there is still mutual crosstalk. This is prevented in the device of FIG. 8 in which the rows 20 of reservoirs 17 (coupled to a plurality of pixels) and the rows 21 of reservoirs 17' are offset with respect to each other.

FIG. 9 finally shows how the display device 1 of FIG. 1 can be used. This Figure shows a part of the panel 2 with a part of the reservoir 6 and some typical light paths associated with pixels (or columns of pixels) A, B, C, D. FIG. 9A is related to the situation of the second state described hereinbefore, in which light of each pixel (or columns of pixels) A, B, C, D is reflected by a lenticular meniscus (denoted by dotted lines, solid lines, broken lines and dot-and-dash lines, respectively). Due to the lens action of the lenticular elements, the light of the pixels (or columns of pixels) A, B, C, D is deflected in different directions and a viewer 22 sees light from different pixels with different eyes (stereo image). In FIG. 9B, related to the situation of the state described above with a flat meniscus, the lens action is eliminated and the viewer sees all pixels (or columns of pixels) A, B, C, D with each eye.

If necessary, extra lens action can be obtained by providing the upper surface of the reservoir 5 with a curvature or by means of an auxiliary lens.

The invention resides in each and every novel characteristic feature and each and every combination of characteristic features. Reference numerals in the claims do not limit their protective scope. Use of the verb "comprise" and its conjugations does not exclude the presence of elements other than those stated in the claims. Use of the article "a" or "an" preceding an element does not exclude the presence of a plurality of such elements.

The invention claimed is:

1. A display apparatus comprising a display device for displaying images comprising pixels, and further comprising means for switching between different types of images of the pixels, wherein the means for switching between the different types of images comprise at least one reservoir containing at least two substantially immiscible fluids having a different refractive index and a different electrical conductivity, and are also provided with drive means for varying the shape of an interface between the fluids.

2. A display apparatus as claimed in claim 1, comprising two immiscible fluids having a different refractive index, one of which is electrically conducting and one is substantially insulating, while the shape of the interface is switchable between a curved and a flat surface.

3. A display apparatus as claimed in claim 1, comprising reservoirs having a substantially circular cross-section, viewed in the direction of an image plane.

4. A display device as claimed in claim 1, comprising reservoirs having a substantially rectangular or hexagonal cross-section, viewed in the direction of an image plane.

5. A display apparatus as claimed in claim 4, wherein, viewed with respect to rows of pixels, sides of the reservoirs extend at an acute angle to the direction of rows of pixels.

6. A display apparatus as claimed in claim 4, wherein, viewed in consecutive rows of reservoirs, the reservoirs are offset with respect to each other.

7. A display apparatus as claimed in claim 1, comprising a common reservoir for a plurality of pixels.

* * * * *